(12) United States Patent
Mochrie et al.

(10) Patent No.: US 12,078,109 B2
(45) Date of Patent: Sep. 3, 2024

(54) FUEL MANAGEMENT SYSTEM

(71) Applicant: ROLLS-ROYCE plc, London (GB)

(72) Inventors: Richard G Mochrie, Guildford (GB); Graeme E F Sutcliffe, Derby (GB); Jade Whittle, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/166,253

(22) Filed: Feb. 8, 2023

(65) Prior Publication Data

US 2023/0279812 A1 Sep. 7, 2023

(30) Foreign Application Priority Data

Mar. 3, 2022 (GB) ..................................... 2202948

(51) Int. Cl.
*F02C 7/224* (2006.01)
*F02C 7/16* (2006.01)
*F02C 9/28* (2006.01)

(52) U.S. Cl.
CPC ............... *F02C 7/224* (2013.01); *F02C 7/16* (2013.01); *F02C 9/28* (2013.01); *F05D 2220/32* (2013.01); *F05D 2240/35* (2013.01); *F05D 2260/213* (2013.01); *F05D 2260/232* (2013.01)

(58) Field of Classification Search
CPC .. F02C 7/224; F02C 9/38; F02C 7/236; F05D 2260/213
See application file for complete search history.

(56) References Cited

U.S. PATENT DOCUMENTS

| | | | |
|---|---|---|---|
| 3,486,458 A | 12/1969 | Tyler | |
| 3,779,007 A | 12/1973 | Lavash | |
| 5,116,362 A | 5/1992 | Arline et al. | |
| 5,438,823 A | 8/1995 | Loxley et al. | |
| 6,182,435 B1 * | 2/2001 | Niggemann | F01D 25/12 60/730 |
| 6,981,359 B2 | 1/2006 | Wernberg et al. | |
| 7,185,485 B2 | 3/2007 | Lewis | |

(Continued)

FOREIGN PATENT DOCUMENTS

| | | |
|---|---|---|
| FR | 2992306 A1 | 12/2013 |
| GB | 1194041 A | 6/1970 |
| GB | 2 289 722 A | 11/1995 |

OTHER PUBLICATIONS

Jul. 10, 2023 extended Search Report issued in European Patent Application No. 23155255.5.

(Continued)

*Primary Examiner* — Katheryn A Malatek
(74) *Attorney, Agent, or Firm* — Oliff PLC

(57) ABSTRACT

A fuel management system for a gas turbine engine, the fuel management system comprising a fuel supply line configured to supply fuel from a system inlet to a combustor of the gas turbine engine via a combustor pump and combustor valve. A heat exchanger is configured to reject heat from a thermal load of the gas turbine engine to fuel in the fuel supply line between the system inlet and the combustor valve. There is a downstream recirculation line configured to recirculate a downstream excess portion of fuel from the fuel supply line, the downstream recirculation line extending from a downstream recirculation point on the fuel supply line between the heat exchanger and the combustor valve.

14 Claims, 6 Drawing Sheets

(56) References Cited

U.S. PATENT DOCUMENTS

| | | | |
|---|---|---|---|
| 8,925,322 | B2 | 1/2015 | Scully et al. |
| 10,752,374 | B1 | 8/2020 | Lui et al. |
| 11,560,239 | B2 | 1/2023 | Rambo et al. |
| 2003/0074884 | A1 | 4/2003 | Snow et al. |
| 2012/0297780 | A1 | 11/2012 | Bruno et al. |
| 2012/0312037 | A1 | 12/2012 | Finney et al. |
| 2015/0323186 | A1 | 11/2015 | Xu |
| 2016/0230669 | A1 | 8/2016 | Selstad et al. |
| 2016/0281656 | A1 | 9/2016 | Alecu et al. |
| 2019/0277201 | A1 | 9/2019 | Veilleux, Jr. et al. |
| 2020/0332716 | A1 | 10/2020 | Ribarov |
| 2021/0229827 | A1 | 7/2021 | Doman |

OTHER PUBLICATIONS

Jul. 10, 2023 extended Search Report issued in European Patent Application No. 23155253.0.

Jul. 10, 2023 extended Search Report issued in European Patent Application No. 23155251.4.

Jul. 10, 2023 extended Search Report issued in European Patent Application No. 23155250.6.

Nov. 16, 2023 U.S. Office Action issued in U.S. Appl. No. 18/166,285.

Sep. 30, 2022 Search Report issued in European Patent Application No. GB2206111.3.

Aug. 22, 2022 Search Report issued in European Patent Application No. GB2202948.2.

Aug. 22, 2022 Search Report issued in European Application No. GB2202947.4.

Jul. 28, 2022 Search Report issued in European Patent Application No. GB2202946.6.

U.S. Appl. No. 18/166,308, filed Feb. 8, 2023 on behalf of Richard G Mochrie.

U.S. Appl. No. 18/166,268, filed Feb. 8, 2023 on behalf of Richard G Mochrie.

U.S. Appl. No. 18/166,285, filed Feb. 8, 2023 on behalf of Richard G Mochrie.

Sep. 14, 2023 Office Action issued U.S. Appl. No. 18/166,268.

Mar. 22, 2024 Notice of Allowance Issued in U.S. Appl. No. 18/166,268.

Jan. 22, 2024 Notice of Allowance issued in U.S. Appl. No. 18/166,285.

Jun. 11, 2024 U.S. Office Action issued in U.S. Appl. No. 18/166,308.

\* cited by examiner

FUEL MANAGEMENT SYSTEM

This disclosure claims the benefit of UK Patent Application No. GB 2202948.2, filed on 3 Mar. 2022, which is hereby incorporated herein in its entirety.

TECHNICAL FIELD

The present disclosure relates to a fuel management system for a gas turbine engine. It relates further to a gas turbine comprising a fuel management system.

BACKGROUND

Fuel management systems are conventionally used for providing fuel to a gas turbine engine and for management of thermal loads. Fuel can be used as a heat sink into which heat from the thermal loads may be rejected prior to the fuel being provided to a combustor or a reheat of a gas turbine engine. Heat exchange apparatus is typically provided for the purpose of facilitating heat rejection from the thermal loads into the fuel within a fuel management system.

Known fuel management systems can be complex in nature, with a large mass or installation volume. It is therefore desirable to provide an improved fuel management system.

SUMMARY

According to a first aspect there is provided a fuel management system for a gas turbine engine, the fuel management system comprising: a fuel supply line to configured to supply fuel from an inlet to a combustor of the gas turbine engine via a combustor valve; a combustor pump disposed along the fuel supply line upstream of the combustor valve, configured to pressurise fuel to a delivery pressure for the combustor; a heat exchanger configured to reject heat from a thermal load of the gas turbine engine to fuel in the fuel supply line between the inlet and the combustor valve; wherein the combustor valve is configured to pass a burn portion of fuel from the fuel supply line to the combustor; and wherein the fuel management system further comprises a downstream recirculation line configured to recirculate a downstream excess portion of fuel from the fuel supply line, the downstream recirculation line extending from a downstream recirculation point on the fuel supply line between the heat exchanger and the combustor valve; wherein the downstream recirculation line is configured to recirculate the downstream excess portion of fuel for resupply to the fuel supply line.

It may be that the heat exchanger is located downstream of the combustor pump. It may be that the downstream recirculation line is configured to recirculate the downstream excess portion of fuel to a fuel tank for subsequent resupply to the fuel supply line.

The fuel management system may further comprise a fuel flow controller configured to: receive a cooling signal relating to a cooling demand of the thermal load; and control the combustor pump to vary a flow rate of fuel through the heat exchanger based on at least the cooling signal to meet the cooling demand of the thermal load.

It may be that the thermal load comprises a process fluid circuit configured to circulate a process fluid, wherein the heat exchanger is configured to reject heat from the process fluid to fuel in the fuel supply line between the combustor pump and the combustor valve; and wherein the cooling signal relates to a temperature of the process fluid at a temperature monitoring location of the process fluid circuit.

It may also be that the fuel management system further comprises a burn controller configured to: receive a burn signal relating to a fuel demand of the combustor; and control the combustor valve to meet the fuel demand, based on at least the burn signal.

Otherwise, it may be that the fuel flow controller is configured to: receive a burn signal relating to a fuel demand of the combustor; and control the combustor pump and the combustor valve based on at least the cooling signal and the burn signal to meet the cooling demand of the thermal load and to meet the fuel demand of the combustor. The fuel management system may further comprise a flow sensor configured to monitor a burn flow rate of the burn portion of fuel and the control of the combustor pump and the combustor valve to meet the fuel demand of the combustor may be based on at least the monitored burn flow rate.

The heat exchanger may be a downstream heat exchanger and the thermal load may be a downstream thermal load. In addition, there may be first and second pumps on the fuel supply line, the first pump being configured to receive fuel and discharge it at a first low pressure, the second pump being provided by the combustor pump. The second pump may be configured to receive fuel discharged from the first pump and discharge it at a second higher pressure for supply to the combustor. In addition, the fuel management system may further comprise: an upstream heat exchanger configured to reject heat from an upstream thermal load of the gas turbine engine to fuel in the fuel supply line upstream of the second pump; and an upstream recirculation line configured to recirculate an upstream excess portion of fuel from the fuel supply line, the upstream recirculation line extending from an upstream recirculation point on the fuel supply line between the upstream heat exchanger and the second pump; and wherein the upstream recirculation line is configured to recirculate the upstream excess portion of fuel for resupply to the fuel supply line.

It may be that the upstream heat exchanger is located between the first pump and the second pump. It may be that the upstream heat exchanger is configured to reject the heat from the upstream thermal load to fuel in the fuel supply line between the first pump and the second pump.

The fuel management system may be configured to control flow through each of the upstream recirculation line and the downstream recirculation line using respective upstream and downstream recirculation valves, the downstream recirculation valve being provided by the combustor valve; wherein the fuel management system is operable in at least: an upstream recirculation mode in which the upstream recirculation valve is open and the downstream recirculation valve is closed; and a downstream recirculation mode in which the upstream recirculation valve is closed and the upstream recirculation valve is open.

It may be that the downstream recirculation valve comprises a three-way valve configured to receive fuel from the fuel supply line and selectively discharge fuel to the combustor or the downstream recirculation line.

It may be that, in the upstream recirculation mode, the fuel flow controller is configured to control the first pump to vary a flow rate of fuel through the upstream heat exchanger to meet the upstream cooling demand. It may also be that, in the downstream recirculation mode, the fuel flow controller is configured to control at least the second pump to vary a flow rate of fuel through the downstream heat exchanger to meet the downstream cooling demand. In each of the modes, it may be that the fuel flow controller controls the first pump, the second pump and the downstream recirculation valve to meet the fuel demand of the combustor.

The fuel management system may be further operable in a dual recirculation mode in which the upstream recirculation valve is open and the downstream recirculation valve is open; wherein in the dual recirculation mode, the fuel flow controller is configured to: control the first pump to vary a flow rate of fuel through the upstream heat exchanger to meet the upstream cooling demand; control at least the second pump to vary a flow rate of fuel through the downstream heat exchanger to meet the downstream cooling demand; control the upstream recirculation valve to cause or permit the upstream excess portion of fuel to be recirculated by the upstream recirculation line for resupply to the fuel supply line, the excess portion of fuel corresponding to a difference between the flow rates of fuel through the upstream and downstream heat exchangers.

Further, it may be that the fuel flow controller is configured to receive a cooling signal relating to a cooling demand of the upstream thermal load and that the fuel flow controller is configured to control the first and second pumps and the combustor valve to meet the cooling demands of the upstream and downstream thermal loads, and to meet the fuel demand of the combustor.

The fuel management system may further comprise a reheat fuel supply line configured to supply fuel from the system inlet to a reheat of the gas turbine engine, the reheat fuel supply line extending from a reheat branching point on the upstream recirculation line to the reheat via a reheat pump and a reheat control valve. The fuel flow controller may be additionally configured to control the reheat pump and/or the reheat control valve to meet a fuel demand of the reheat.

According to a second aspect, there is provided a gas turbine engine comprising a fuel management system according to the first aspect, wherein the gas turbine engine directs fuel to the system inlet, and the gas turbine engine provides the combustor, the downstream thermal load, and where present the upstream thermal load and/or the reheat.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect, there is provided an aircraft comprising a cabin blower system or a gas turbine engine as described and/or claimed herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
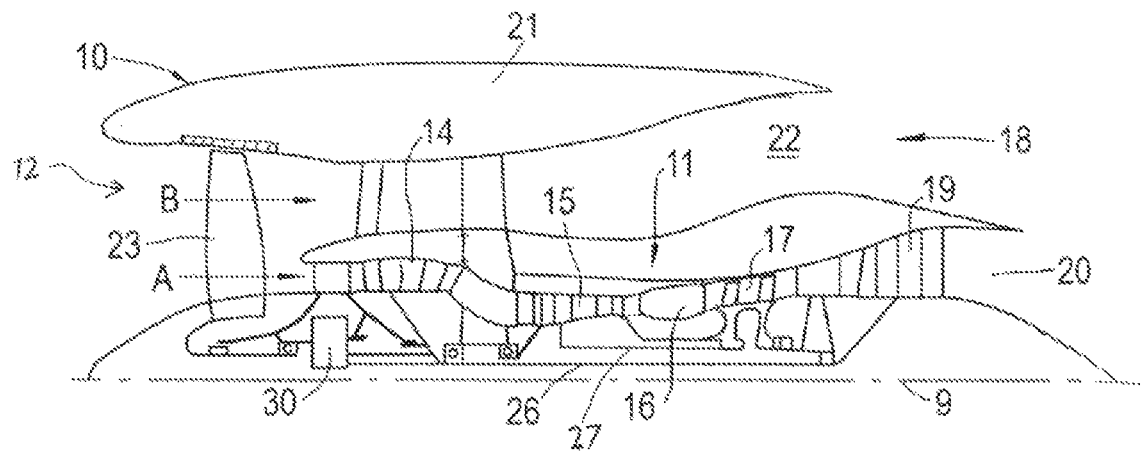
FIG. 1 shows a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustor 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 1616 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
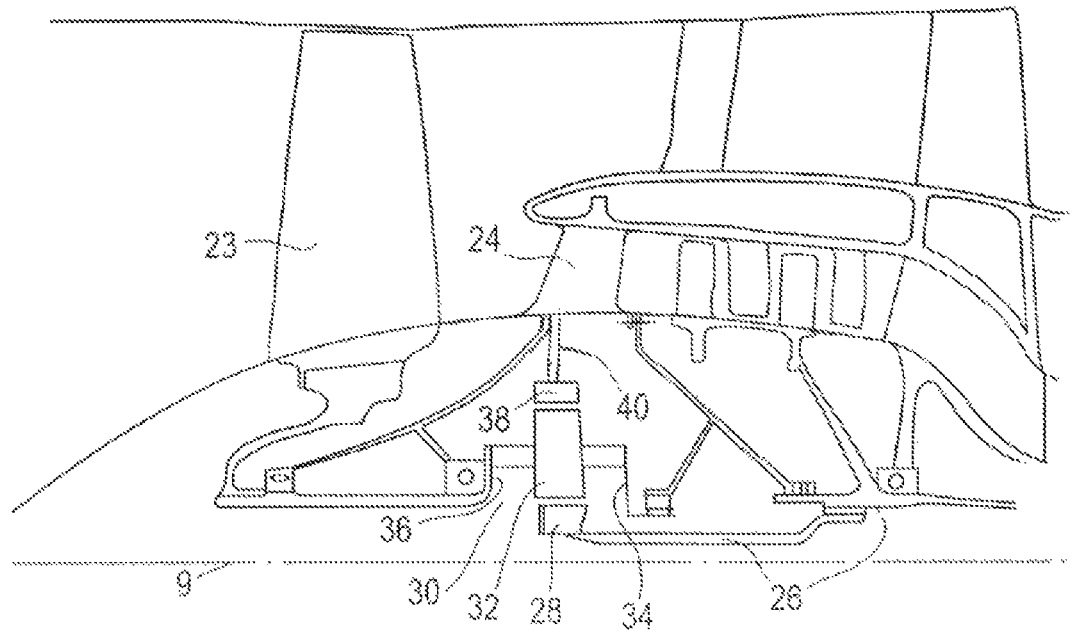
FIG. 2 shows a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
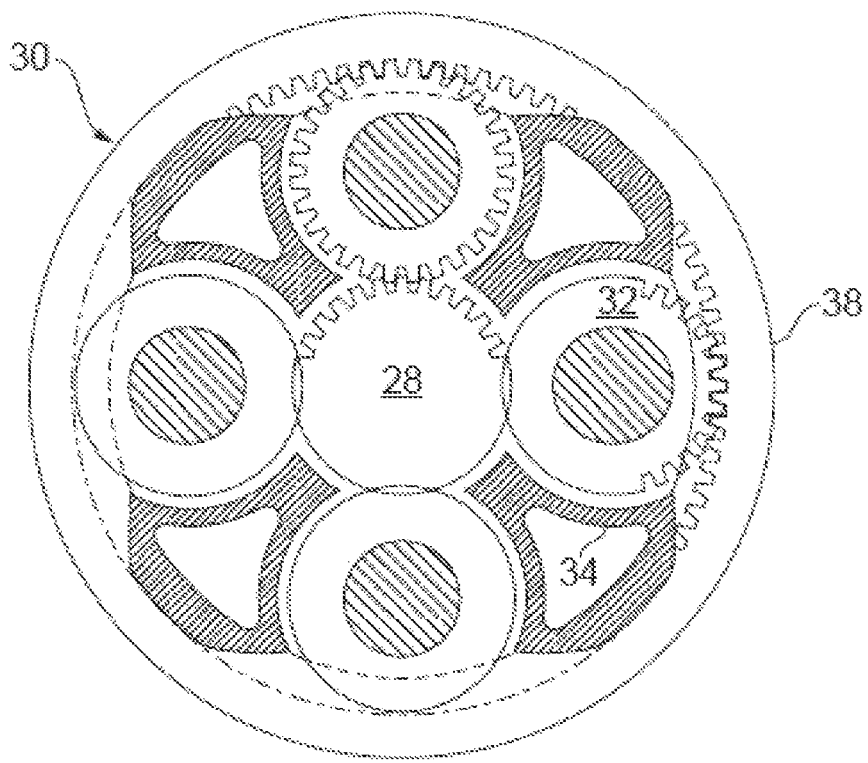
FIG. 3 shows a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
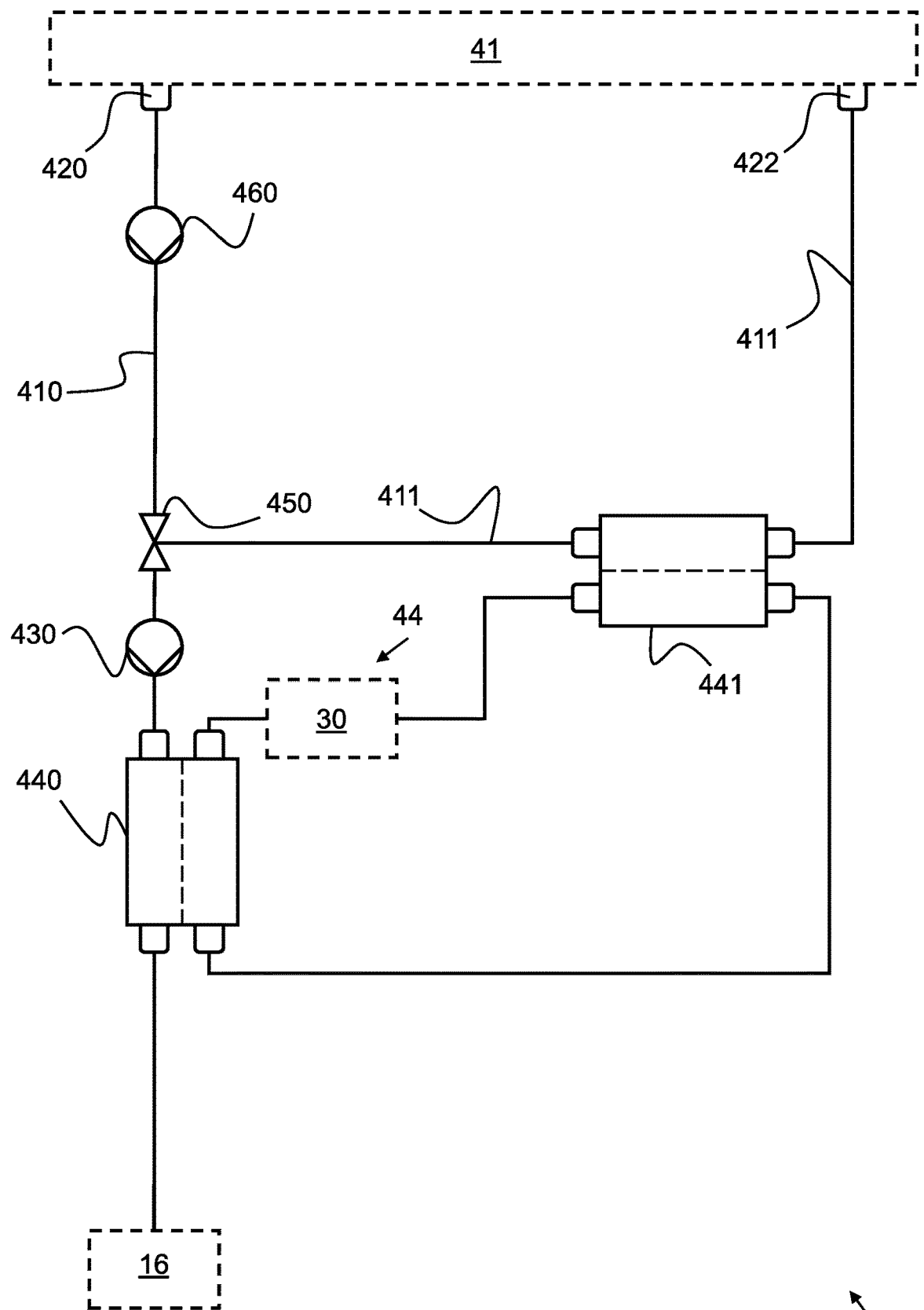
FIG. 4 shows a schematic view of a conventional fuel management system.

FIG. 4 shows a schematic view of a previously considered fuel management system 400. The fuel management system 400 comprises a fuel supply line 410 configured to supply fuel from a fuel management system inlet 420 to a combustor 16 of the gas turbine engine via a combustor valve 450. The inlet 420 is configured to receive fuel from a bulk fuel storage system, such as a fuel tank 41 of the gas turbine engine and/or a fuel tank 41 of an aircraft. The fuel management system 400 further comprises a first pump 460 and a second pump 430 on the fuel supply line 410. The first pump 460 is configured to receive fuel from the system inlet 420 and to discharge fuel at a first low pressure. The second pump 430 is configured to receive fuel discharged by the first pump 460 at the first low pressure and to discharge fuel at a second higher pressure for supply to the combustor 16 of the gas turbine engine (that is, the delivery pressure for the combustor 16).

The present disclosure refers to a downstream heat exchanger, and the expression downstream may relate to the heat exchanger being downstream of another heat exchanger on the fuel supply line, being downstream of a pump which pressurises the fuel to a pressure for discharge through the combustor. The disclosure envisages variants of the specific examples in which the respective heat exchanger is downstream of neither of these things (i.e. not downstream of any other heat exchanger, and not downstream of the pump). For example, the heat exchanger may be upstream of the pump, and the pump may otherwise function as described below to draw a flow of fuel through the heat exchanger. As such, while several of the examples refer to a downstream heat exchanger, the disclosure envisages implementations in which the heat exchanger is not "downstream". The same applies to discussion of a "downstream thermal load" which is referred to in the examples because of its association with the downstream heat exchanger.

The fuel management system 400 comprises a downstream heat exchanger 440 located downstream of the second pump 430. The downstream heat exchanger 440 is configured to exchange heat from a downstream thermal load 44 of the gas turbine engine to fuel in the fuel supply line 410 at a location between the second pump 430 and the combustor 16. The combustor valve 450 is configured to pass a burn portion of fuel from the fuel supply line 410 to the combustor 16 via the second pump 430 and the downstream heat exchanger 440. Accordingly, the fuel supply line 410 is configured to supply fuel from the system inlet 420 to the combustor 16 via the combustor valve 450 such that fuel being passed to the combustor 16 (i.e. the burn portion of fuel) has been subject to pressurisation to the delivery pressure by the second pump 430 and has also passed through the downstream heat exchanger 440.

The fuel management system 400 further comprises a recirculation line 411 configured to recirculate an excess portion of fuel from the fuel supply line 410 for resupply to the fuel supply line 410. The recirculation line 411 extends from the combustor valve 450 to a fuel management system outlet 422. Further, the recirculation line 411 is configured to recirculate the excess portion of fuel to the fuel tank 41 via the fuel management system outlet 422 for subsequent resupply to the fuel supply line 410.

The fuel management system further comprises a recirculation heat exchanger 441 located on the recirculation line 411 between the combustor valve 450 and the system outlet 422. The recirculation heat exchanger 441 is configured to reject heat from the downstream thermal load 44 of the gas turbine engine to fuel in the recirculation line 411 (i.e. to the excess portion of fuel).

The excess portion is the portion of fuel flowing in the fuel supply line 410 that does not pass to the combustor 16, and so a flow rate of the excess portion is equal to the total flow rate in the fuel supply line (upstream of the recirculation line) less the flow rate of the burn portion. A flow rate of the excess portion of fuel is dependent on both a fuel demand of the combustor 16 and a cooling demand of the downstream thermal load 44.

The fuel demand corresponds to a flow rate of fuel which is required to be passed to and burned by the combustor 16 in order to operate the combustor 16 at an operational setpoint. The cooling demand corresponds to an amount of heat rejection required from the downstream thermal load 44 according to operation of the downstream thermal load (which may be separately controlled). The cooling demand is met by heat exchange between fuel in the fuel management system 400 and the downstream thermal load 44, which in this example occurs in both the downstream heat exchanger 440 and the recirculation heat exchanger 441 in order to provide adequate cooling to the downstream thermal load 44.

The provision of the recirculation heat exchanger 441 along the recirculation line 411 provides cooling capacity to the fuel management system 400 in addition to that provided by the downstream heat exchanger 440 on the line to the combustor 16, such that the fuel management system 400 is able to meet the cooling demand of the downstream thermal load 44 independently of controlling the fuel demand of the combustor 16, in particular by varying the recirculating flow of excess fuel.

Figure 5A:
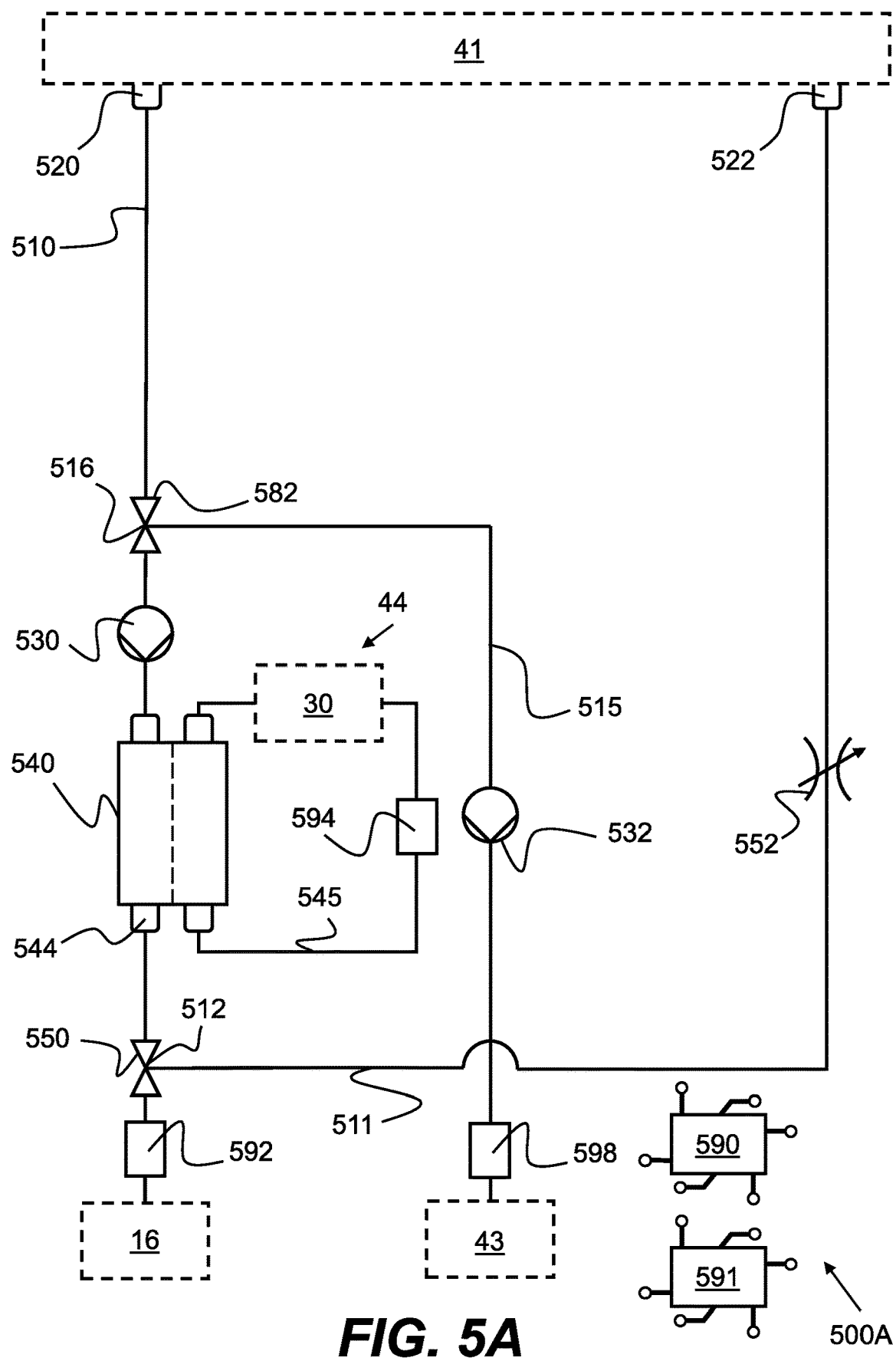
FIG. 5A shows a schematic view of a first example fuel management system according to the present disclosure.

FIG. 5A shows a schematic view of a first example fuel management system 500A for a gas turbine engine according to the present disclosure. The fuel management system 500A comprises a fuel supply line 510 configured to supply fuel from a fuel management system inlet 520 to a combustor 16 of the gas turbine engine via a combustor valve 550. The inlet 520 is configured to receive fuel from a bulk fuel storage system, such as a fuel tank 41 of the gas turbine engine and/or a fuel tank 41 of an aircraft. The fuel management system 500A further comprises a combustor pump 530 located upstream of the combustor valve 550 along the fuel supply line 510. The combustor pump 530 is configured to increase a pressure of fuel within the fuel supply line 510 and thereby pressurise fuel to a delivery pressure for the combustor 16.

The fuel management system 500A comprises a downstream heat exchanger 540 located on the fuel supply line 510 located between the system inlet 520 and the combustor valve 550 (for example downstream of the combustor pump 530). The downstream heat exchanger 540 is configured to exchange heat from a downstream thermal load 44 of the gas turbine engine to fuel in the fuel supply line 510 at a location between the system inlet 520 and the combustor valve 550 (for example between the combustor pump 530 and the combustor valve 550). Accordingly, the fuel supply line 510 is configured to supply fuel from the system inlet 520 to the combustor 16 via the combustor valve 550 such that fuel passing through the combustor valve 550 has been subject to pressurisation to the delivery pressure by the combustor pump 530 and has also passed through the downstream heat exchanger 540.

The combustor valve 550 is configured to pass a burn portion of fuel from the fuel supply line 510 to the combustor 16. References herein to a portion of fuel should be understood as referring to a flow rate of the fuel, constituting a portion of a total or maximum flow rate in the fuel management system, which.

The fuel management system 500A further comprises a downstream recirculation line 511 configured to recirculate a downstream excess portion of fuel from the fuel supply line 510 for resupply to the fuel supply line 510. The downstream recirculation line extends from a downstream recirculation point 512 on the fuel supply line 510, which is located between the downstream heat exchanger 540 and the combustor valve 550, inclusive. In the example of FIG. 5A, the downstream recirculation point 512 is located at the combustor valve 550. In variants of this example, the downstream recirculation point 512 may be located at an outlet 544 of the downstream heat exchanger 540, or at an intermediate position between the outlet 544 of the downstream heat exchanger 540 and the combustor valve 550.

In the example of FIG. 5A, the downstream recirculation line 511 is configured to recirculate the downstream excess portion of fuel to the fuel tank 41 via a fuel management system outlet 522 for subsequent resupply to the fuel supply line 510. However, it will be appreciated that in variants of this example, the downstream recirculation line 511 may be configured to recirculate the downstream excess portion of fuel to the fuel supply line 510 at a location on the fuel supply line 510 which is upstream of the downstream heat exchanger 540, either directly or via one or more other components (such as a local engine-located fuel tank) without returning to the fuel tank 41. Also in the example of FIG. 5A, the downstream recirculation line 511 is provided with a pressure reducing element 552 (such as a pressure reducing valve or an orifice plate). The downstream excess portion of fuel is received from the fuel supply line 510 at the delivery pressure for the combustor 16. The pressure reducing element 552 is configured to reduce the pressure of the downstream excess portion of fuel prior to subsequent resupply to the fuel supply line 510.

The total flow rate of fuel within the fuel supply line 510 between the combustor pump 530 and the combustor valve 550 is controllable by control of the combustor pump 530 and may be referred to as a total downstream portion of fuel. This downstream portion of fuel passes through the downstream heat exchanger 540, such that heat transfer at the downstream heat exchanger is controllable by control of the combustor pump 530.

The burn portion is a portion of the total downstream portion of fuel within the fuel supply line 510 between the combustor pump 530 and the combustor valve 550 which is passed to the combustor 16 for combustion therein. The downstream excess portion of fuel is a portion of the total downstream portion of fuel which is not passed to the combustor 16 for combustion therein. Instead, the downstream excess portion of fuel is passed through the downstream heat exchanger 540 and is then recirculated by the downstream recirculation line 511.

As described above, the combustor valve 550 is configured to pass the burn portion of fuel from the fuel supply line 510 to the combustor 16. Any fuel within the fuel supply line 510 between the downstream heat exchanger 540 and the combustor valve 550 which is not passed to the combustor 16 by the combustor valve 550 (i.e. the downstream excess fuel portion) is recirculated by the downstream recirculation line 511. A split between the burn portion and the downstream excess portion is therefore controlled by the combustor valve 550.

It may be that the combustor valve 550 comprises a two-port valve which is configured to restrict the flow of fuel passing to the combustor 16, such that the remaining downstream excess portion is directed into the downstream recirculation line 511.

A flow rate of the total downstream portion of fuel may be dependent on a cooling demand of the downstream thermal load 44 and/or a fuel demand of the combustor 16. For example, the cooling demand of the downstream thermal load 44 may require that the flow rate of the total downstream portion of fuel is increased to increase heat transfer at the downstream heat exchanger 540, independently of any variation of the fuel demand of the combustor. Separately, the fuel demand of the combustor 16 may require the flow rate of the total downstream portion of fuel to be increased such that the combustor 16 is supplied with a flow rate of fuel which is sufficient to operate the combustor 16 at an operational setpoint thereof. Such an increase may be required, for example, when there is a relatively large fuel demand of the combustor together with a relative low cooling demand.

The cooling demand of the downstream thermal load 44 corresponds to a flow rate of fuel which is required to be passed through the downstream heat exchanger 540 in order to provide a sufficient rate of heat transfer at the downstream heat exchanger 540.

The fuel demand of the combustor 16 corresponds to a flow rate of fuel which is required to be burned (i.e. combusted) by the combustor 16 in order to operate the combustor 16 at an operational setpoint. An operational setpoint of the combustor 16 may be related to a quantity of thrust demanded from gas turbine engine by, for example, an electronic fly-by-wire control system. The quantity of thrust demanded (i.e. the thrust demand) may vary continuously and/or discretely while the fuel management system 500A is in use, and so the fuel demand of the combustor 16 (and therefore the flow rate of the burn portion of fuel) may vary continuously and/or discretely while the fuel management system 500A is in use.

In view of the discussion above, it follows that the flow rate of the downstream excess portion of fuel is dependent on both the fuel demand of the combustor 16 and the cooling demand of the downstream thermal load 44.

When the fuel demand of the combustor 16 corresponds to a flow rate of the burn portion of fuel which is greater flow rate of the total downstream flow than is required to meet the cooling demand, it may be that the flow rate of the downstream excess portion of fuel is zero or minimal.

Conversely, when the cooling demand corresponds to a greater flow rate of the total downstream portion of fuel than the flow rate of the burn portion required to meet the fuel demand of the combustor 16, the flow rate of the downstream excess portion is equal to the difference between the flow rate of the total downstream portion and the flow rate of the burn portion.

The fuel management system 500A may further comprise a fuel flow controller 590 configured to receive a downstream cooling signal relating to a cooling demand of the downstream thermal load 44. The fuel flow controller 590 may be configured to control the combustor pump 530 so as to vary a flow rate of the total downstream portion of fuel based on at least the downstream cooling signal in order to meet the cooling demand of the downstream thermal load 44.

The fuel flow controller 590 may be further configured to receive a burn signal relating to a fuel demand of the combustor 16. The fuel flow controller 590 may be configured to simultaneously control the combustor pump 530 so as to vary flow rate of the total downstream portion of fuel in order to meet the cooling demand of the downstream thermal load 44, and to control the combustor valve 550 and also the combustor pump 530 where necessary so as to vary a flow rate of the burn portion of fuel in order to match the fuel demand of the combustor 16.

The combustor 16 generally receives a flow rate of fuel as required to operate the combustor 16 at a selected operational setpoint. It may be that the downstream thermal load 44 is relatively tolerant of receiving excess cooling (e.g. unlikely to suffer damage or underperformance if there is excess cooling), but less tolerant to insufficient cooling. Therefore, controller 590 may be configured to ensure that the fuel demand of the combustor 16 is matched and to ensure that the cooling demand of the downstream thermal load 44 is met. In some operating conditions, it may only be possible to ensure that the fuel demand of the combustor 16 is met by providing excess cooling to the downstream thermal load 44 (which is still considered to be meeting the cooling demand), and the controller may be configured to permit such excess cooling.

In the example of FIG. 5A, the downstream thermal load 44 comprises a downstream process fluid circuit 545 which is configured to circulate a process fluid through the downstream heat exchanger 540. In such examples, the downstream heat exchanger 540 is configured for heat exchange from the process fluid to fuel in the fuel supply line 510 between the combustor pump 530 and the combustor valve 540. As an example, the downstream thermal load 44 may include a gearbox 30 of the gas turbine engine. The process fluid may be, for example, a lubricant provided to the gearbox 30 of the gas turbine engine.

The downstream cooling signal may relate to an operating state of the downstream thermal load 44. For example, if the downstream thermal load 44 comprises a gearbox 30 of the gas turbine engine, the operating state of the downstream thermal load 44 may be determined based on an operating speed of the gearbox 30, an operating mode of the gearbox 30, a temperature of a lubricant flow for the gearbox 30 (e.g. as recovered from the gearbox) and/or an operating throughput power of the gearbox 30.

The downstream cooling signal may relate to a temperature of the process fluid at a downstream temperature monitoring location of the downstream process flow circuit 545. The downstream process fluid circuit 545 may comprise a downstream temperature sensor 594 configured to monitor the temperature of the process fluid at the downstream temperature monitoring location of the downstream process fluid circuit 545 and configured to provide the downstream cooling signal to the fuel flow controller 590, wherein the downstream cooling signal relates to the temperature of the process fluid at the downstream temperature monitoring location.

The fuel flow controller 590 may control the combustor pump 530 to vary the flow rate of the total downstream portion of fuel and thereby maintain the temperature of the process fluid at the downstream temperature monitoring location within a target temperature range of a process fluid temperature setpoint, or to reduce a temperature error between the process fluid temperature setpoint and the temperature of the process fluid at the temperature monitoring location (e.g. using a PID controller or any other suitable control process).

The fuel management system 500A may further comprise a combustor flow sensor 592 configured to monitor a burn flow rate of the burn portion of fuel (i.e. the flow rate of fuel passed to the combustor 16 by the combustor valve 550). The fuel flow controller 590 may control the combustor pump 530 and the combustor valve 550 so as to vary the burn flow rate in order to meet the fuel demand of the combustor, based at least on the monitored burn flow rate. The fuel flow controller 590 may control the combustor pump 530 and the combustor valve 550 to vary the burn flow rate to maintain the monitored burn flow rate within a target flow rate range of a flow rate of fuel required to match the fuel demand of the combustor 16.

It may be that the fuel demand of the combustor tends to require a lower burn flow rate than the flow rate of the total downstream fuel portion to meet the downstream cooling demand. Decentralised control of the fuel flow for the combustor and for cooling may be appropriate. For example, the fuel management system 500A may comprise a separate burn controller 591 to the fuel flow controller 590, configured to receive the burn signal and to control the combustor valve 550 based on the burn signal in order to match the fuel demand of the combustor 16, without reference to the cooling demand signal. The fuel flow controller 590 may be configured to act independently to receive the cooling signal and to control the combustor pump 530 based on the cooling signal only.

Considering the above disclosure, the fuel management system 500A is configured to selectively vary cooling capacity so as to meet the cooling demand of the downstream thermal load 44 while matching the fuel demand of the combustor 16, by recirculating the downstream excess portion of fuel which is required to meet the cooling demand of the downstream thermal loads but which is not required to match the fuel demand of the combustor 16. In contrast to the previously-considered example of FIG. 4, the cooling demand is adequately met without requiring an additional heat exchange apparatus on the downstream recirculation line 511 itself. Such apparatus is associated with an increased mass and an increased size of the fuel management system 500A.

The fuel management system 500A may further comprise a reheat fuel supply line 515 which is configured to supply fuel from the system inlet 520 to a reheat 43 of the gas turbine engine via the fuel supply line 510 (e.g. via an upstream portion of the fuel supply line 510), a reheat pump 532 and a reheat control valve 582. In the example of FIG. 5A, the reheat fuel supply line 515 extends from a reheat branching point 516 on the fuel supply line 510 to the reheat 43 via the reheat pump 532 and the reheat control valve 582, wherein the reheat branching point 516 is located upstream of the combustor pump 530.

Figure 5B:
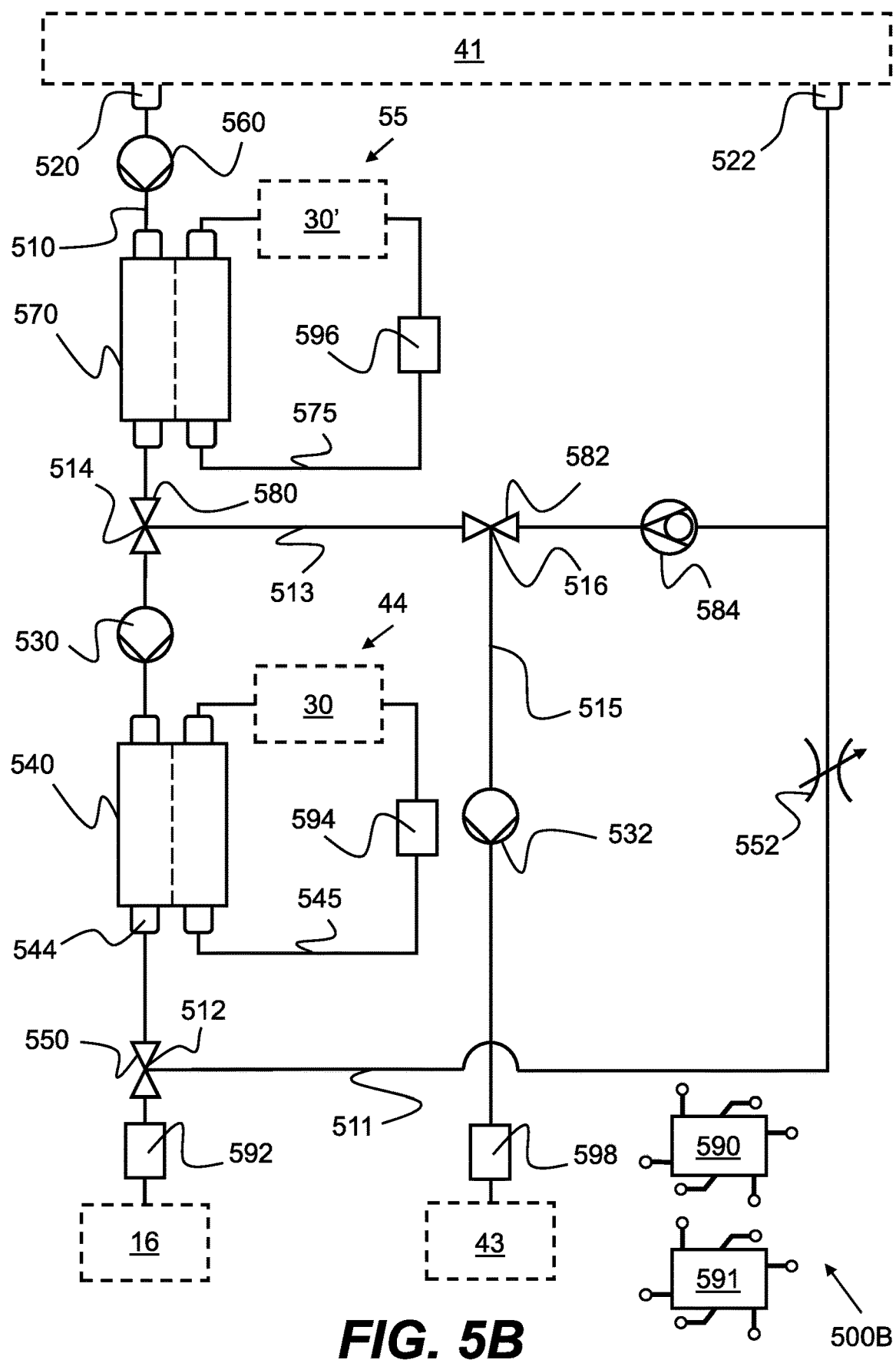
FIG. 5B shows a schematic view of a second example fuel management system according to the present disclosure.

FIG. 5B shows a schematic view of a second example fuel management system 500B for a gas turbine engine according to the present disclosure. The second example fuel management system 500B is generally similar to the first example fuel management system 500A, with like reference numerals indicating common or similar features. In contrast to the first example fuel management system 500A, the second fuel management system 500B comprises a first pump 560 and a second pump 530 on the fuel supply line 510. The first pump 560 is configured to receive fuel from the system inlet 520 and to discharge fuel at a first low pressure. The second pump 530 corresponds to the combustor pump 530 discussed above with respect to FIG. 5B, and the two expressions "second pump" and "combustor pump" may be referred to interchangeably throughout this disclosure. The second pump 530 is configured to receive fuel discharged by the first pump 560 at the first low pressure and to discharge fuel at a second higher pressure for supply to the combustor 16 of the gas turbine engine (that is, the delivery pressure for the combustor 16).

The fuel management system 500B further comprises an upstream heat exchanger 570 and an upstream recirculation line 513. The upstream heat exchanger 540 is located upstream of the second pump 530 (for example between the first pump 560 and the second pump 530) and is configured to transfer heat from an upstream thermal load 55 of the gas turbine engine to fuel in the fuel supply line 510 at a location upstream of the second pump 530. The upstream recirculation line 513 is configured to recirculate an upstream excess portion of fuel from the fuel supply line 510 for resupply to the fuel supply line 510. The upstream recirculation line 513 extends from an upstream recirculation point 514 on the fuel supply line 510, the upstream recirculation point 514 being located between the upstream heat exchanger 570 and the second pump 530, inclusive.

Accordingly, the fuel supply line 510 is configured to supply fuel from the system inlet 520 to the combustor 16 via the combustor valve 550 such that fuel passing through the combustor valve 550 has been subject to pressurisation to the delivery pressure by the second pump 530, having also passed through the first pump 560, the upstream heat exchanger 570 and the downstream heat exchanger 540. When referring to the example of FIG. 5B, the combustor valve 550 may be referred to as a downstream circulation valve 550 and functions as such.

In the example of FIG. 5B, the upstream recirculation line 513 is configured to recirculate the upstream excess portion of fuel to the fuel tank 41 via a path which joins with the downstream recirculation line 511 for subsequent resupply to the fuel supply line 510, such that portions of fuel within the upstream and downstream recirculation lines are in parallel with each other and join to define a combined recirculation line.

If present, the pressure reducing element 552 is configured to reduce the pressure of the downstream excess portion of fuel prior to joining the combined recirculation line to prevent the prevent the downstream excess portion of fuel (which is at the second higher pressure) from causing the upstream excess portion of fuel (which is at the first low pressure) to be driven back through the upstream recirculation line 513 toward the upstream recirculation point 514 and/or to reduce the pressure of the downstream excess portion of fuel prior to subsequently resupply to the fuel supply line 510. Additionally or alternatively, the upstream recirculation line 513 may be provided with a non-return valve 584 configured to prevent the downstream portion of fuel from causing the upstream portion of fuel to be driven back through the upstream recirculation line 513 toward the upstream recirculation point 514, as shown in the example of FIG. 5B.

It will be appreciated that in other examples, the upstream recirculation line 513 (or the combined recirculation line) may be configured to recirculate the upstream excess portion of fuel to the fuel supply line 510 at a location on the fuel supply line 510 which is upstream of the upstream heat exchanger 570, either directly or via one or more other components (such as a local engine-located fuel tank) without returning to the fuel tank 41.

In the example of FIG. 5B, the upstream recirculation point 514 is located at an upstream recirculation valve 580. In variants of this example, the upstream recirculation point 514 may be located at an outlet of the upstream heat exchanger 570, or at an intermediate position between the outlet of the upstream heat exchanger 570 and the second recirculation valve 580. The upstream valve 580 is configured to direct the upstream excess portion of fuel from the fuel supply line 510 into the upstream excess recirculation line 513 and to pass fuel to the second pump 530. As a result, a split between the total downstream portion of fuel and the upstream excess portion of fuel is controllable by actuation of the upstream recirculation valve 580.

The total flow rate of fuel within the fuel supply line 510 between the first fuel pump 560 and the second fuel pump 530 (the total upstream flow rate) may be controllable by control of the first fuel pump 560. Consequently, heat exchange at the upstream heat exchanger 570 is also controllable by control of the first fuel pump 560.

In the examples of FIGS. 5A and 5B, the total downstream portion of fuel is provided at the delivery pressure for the combustor 16 by the second fuel pump 530. In the example of FIG. 5B, the flow rate of the total downstream portion of fuel cannot exceed a total upstream flow rate because the second fuel pump 530 is only configured to receive fuel discharged by the first pump 560.

Like the combustor valve 550, it may be that the upstream recirculation valve 580 comprises a two-port valve which is configured to restrict the flow of fuel within the fuel supply line 510 passing through to the combustor pump 530 (i.e. the total downstream portion of fuel) such that a remaining portion of the fuel is directed into the upstream recirculation line 513 as the upstream excess portion of fuel. The fuel management system 500B may be configured to control the flow of fuel through the upstream recirculation line 513 and through the downstream recirculation line 511 by actuating the upstream recirculation valve 580 and the combustor valve 550, which may be referred to as a downstream recirculation valve 550.

In a variant of this example, the fuel management system 500B may not comprise the upstream recirculation valve 580, and the flow rate of the upstream recirculation excess portion of fuel recirculated by the upstream recirculation line 513 may be controlled according to a differential flow rate between the first fuel pump 560 and the second fuel pump 530. For example, this may occur when the second pump 530 is configured to accept only a limited flow rate corresponding to an operating speed of the second pump itself (e.g. a positive displacement pump).

The flow rate of the total upstream portion of fuel is dependent on a cooling demand of the upstream thermal load 55, the cooling demand of the downstream thermal load 44 and/or the fuel demand of the combustor 16. For example, the cooling demand of the upstream thermal load 55 may require that the flow rate of the total upstream portion of fuel be increased so as to promote heat rejection from the upstream thermal load 55. Additionally or alternatively, the flow rate of the total downstream portion of fuel required to meet the cooling demand of the downstream thermal load 44 and/or to match the fuel demand of the combustor 16 may require that the flow rate of the total upstream portion of fuel be increased.

In a similar way to the cooling demand of the downstream thermal load 44, the cooling demand of the upstream thermal load 55 corresponds to a flow rate of fuel which is required to be passed through the upstream heat exchanger 570 in order to provide a sufficient rate of heat transfer from the upstream thermal load 55 to the fuel in the fuel supply line 510.

A flow rate of the upstream excess portion of fuel is equal to a difference between the flow rate of the total upstream portion of fuel and the flow rate of the total downstream portion of fuel and may be zero in some conditions.

The fuel flow controller 590 may be configured to receive an upstream cooling signal relating to the cooling demand of the upstream thermal load 55 in a similar manner to that described above with respect to the downstream cooling signal. In the example of FIG. 5B, the upstream thermal load 55 comprises an upstream process fluid circuit 575 which is configured to circulate a process fluid through the upstream heat exchanger 570. In such examples, the upstream heat exchanger 570 is configured to transfer heat from the process fluid to fuel in the fuel supply line 510. In various examples, the upstream thermal load 55 may include a heat source 30' of the gas turbine engine. The upstream thermal load 55 may otherwise have similar features to the downstream thermal load 44, and the upstream cooling signal may relate to similar states or parameters with respect to the upstream thermal load 55 compared to which the downstream cooling signal relates with respect to the downstream thermal load 44.

For instance, the upstream cooling signal may relate to a temperature of the process fluid at an upstream temperature monitoring location of the upstream process flow circuit 575. The upstream process fluid circuit 575 may comprise an upstream temperature sensor 596 configured to monitor the temperature of the process fluid at the upstream temperature monitoring location of the upstream process fluid circuit 575 and configured to provide the upstream cooling signal to the fuel flow controller 590, wherein the upstream cooling signal relates to the temperature of the process fluid at the upstream temperature monitoring location. The fuel flow controller 590 may control the first pump 560 to vary the flow rate of the total upstream portion of fuel and thereby maintain the temperature of the process fluid at the upstream temperature monitoring location within a target temperature range of a process fluid temperature setpoint.

Generally, the fuel flow controller 590 may configured to receive the downstream cooling signal, the upstream cooling signal and the burn signal. The fuel flow controller 590 may be further configured to control the first pump 560, the second pump 530, the downstream recirculation valve 550 and where present the upstream recirculation valve 580 based on the upstream cooling signal, the downstream cooling signal and the burn signal to meet all of: the cooling demand of the upstream thermal load 55, the cooling demand of the downstream thermal load 44, and the fuel demand of the combustor 16.

In examples in which it is present, the upstream recirculation valve 580 has an open state and a closed state. In the open state, the upstream recirculation valve 580 is configured to direct fuel into the upstream recirculation line 513 for recirculation thereby. In the closed state, the upstream recirculation valve 580 is configured to prevent fuel from being directed into the upstream recirculation line 513 for recirculation thereby. Similarly, the downstream recirculation valve 550 (which in the example of FIG. 5B is the combustor valve 550) has an open state and a closed state. In the open state, the downstream recirculation valve 550 is configured to direct fuel into the downstream recirculation line 511 for recirculation thereby. In the closed state, the downstream recirculation valve 550 is configured to prevent fuel from being directed into the downstream recirculation line 511 for recirculation thereby.

The fuel management system 500B is configured to selectively operate in an upstream recirculation mode in which the upstream recirculation valve 580 is open such that the upstream excess portion of fuel is recirculated by the upstream recirculation line 513, and in which the downstream recirculation valve 550 is closed such that no fuel is recirculated by the downstream recirculation line 511. The fuel management system 500B is also configured to selectively operate in a downstream recirculation mode in which the downstream recirculation valve 550 is open such that the downstream excess portion of fuel is recirculated by the downstream recirculation line 511, and in which the upstream recirculation valve 580 is closed such that no fuel is recirculated by the upstream recirculation line 513.

To this end, it may be that the upstream recirculation valve 580 comprises a three-way valve which is configured to receive fuel from the supply line 510 and to selectively discharge fuel into the upstream recirculation line 513 and pass fuel to the second pump 530. Likewise, it may be that the downstream recirculation valve 550 comprises a three-way valve which is configured to receive fuel from the supply line 510 and to selectively discharge fuel into the downstream recirculation line 511 and pass fuel to the combustor 16, as shown in the example of FIG. 5A. Use of three way valves for the respective recirculation valves enables the fuel management system 500B to selectively close the respective recirculation lines.

When in the upstream recirculation mode, the fuel flow controller 590 may be configured to control the first pump 560 to vary the flow rate of fuel through the upstream heat exchanger 570 (i.e. to vary the flow rate of the total upstream portion of fuel) to meet the upstream cooling demand. When in the downstream recirculation mode, the fuel flow controller 590 may be configured to control the second pump 530 and optionally also the first pump 560 to vary the flow rate of fuel through the downstream heat exchanger 540 (i.e. to vary the flow rate of the total downstream portion of fuel) to meet the downstream cooling demand. Additionally, in both modes, the fuel flow controller 590 controls the first pump 560, the second pump 530 and the downstream recirculation valve 550 to match the fuel demand of the combustor 16. This configuration provides a simple control logic which is able to meet the respective cooling demands while simultaneously matching the fuel demand of the combustor 16.

In addition, the fuel management system 500B may be configured to selectively operate in a dual recirculation mode in which the upstream recirculation valve 580 is open such that the upstream excess portion of fuel is recirculated by the upstream recirculation line 513 and in which the downstream recirculation valve 550 is open such that the downstream excess portion of fuel is recirculated by the downstream recirculation line 511. This may permit a higher flow rate in the upstream heat exchanger to meet the upstream cooling demand than the flow rate required in the downstream heat exchanger, which may also be larger than the burn flow rate required by the combustor. By permitting the upstream excess flow to be recirculated upstream of the second pump, additional work on that quantity of fuel by second pump is avoided, and excessive cooling at the downstream heat exchanger can be avoided, thereby conserving cooling capacity in the recirculated fuel for subsequent use.

As in the example of FIG. 5A, the fuel management system 500B further comprises a reheat fuel supply line 515 which is configured to supply fuel from the system inlet 520 to a reheat 43 of the gas turbine engine via the fuel supply line 510, the upstream recirculation line 513, a reheat pump 532 and a reheat control valve 582. In the example of FIG. 5B, the reheat fuel supply line 515 extends from a reheat branching point 516 on the upstream recirculation line 513 to the reheat 43 via the reheat pump 532 and the reheat control valve 582. A flow rate of fuel provided to the reheat 43 is maintained by the reheat pump 532 and the reheat control valve 582. The fuel flow controller 590 may be further configured to receive a reheat signal relating to a fuel demand of the reheat 43. The fuel flow controller 590 may be additionally configured to control the reheat pump 532 and/or the reheat control valve to a match a fuel demand of the reheat 43 based on at least the reheat signal. The fuel management system 500B may further comprise a reheat flow sensor 598 configured to monitor a reheat flow rate of the fuel provided to the reheat 43. That is to say that the reheat flow sensor 598 is configured to monitor the flow rate of fuel passed to the reheat 43 by the reheat control valve 582. The fuel flow controller 590 may then control the reheat pump 532 and the reheat control valve 583 in order to match the fuel demand of the reheat 43 based at least on the monitored reheat flow rate. The fuel flow controller 590 may control the reheat pump 532 and the reheat control valve 582 to vary the flow rate of fuel provided to the reheat 43 and thereby maintain the monitored reheat flow rate within a target flow rate range of a flow rate of fuel required to match the fuel demand of the reheat 43.

By providing the reheat fuel supply line 515 branching from the upstream recirculation line 513, the reheat line receives fuel at the first low pressure and so the flow and pressure of the fuel provided to the reheat 43 may be controlled independently of the fuel which is provided to the combustor 16.

Figure 6:
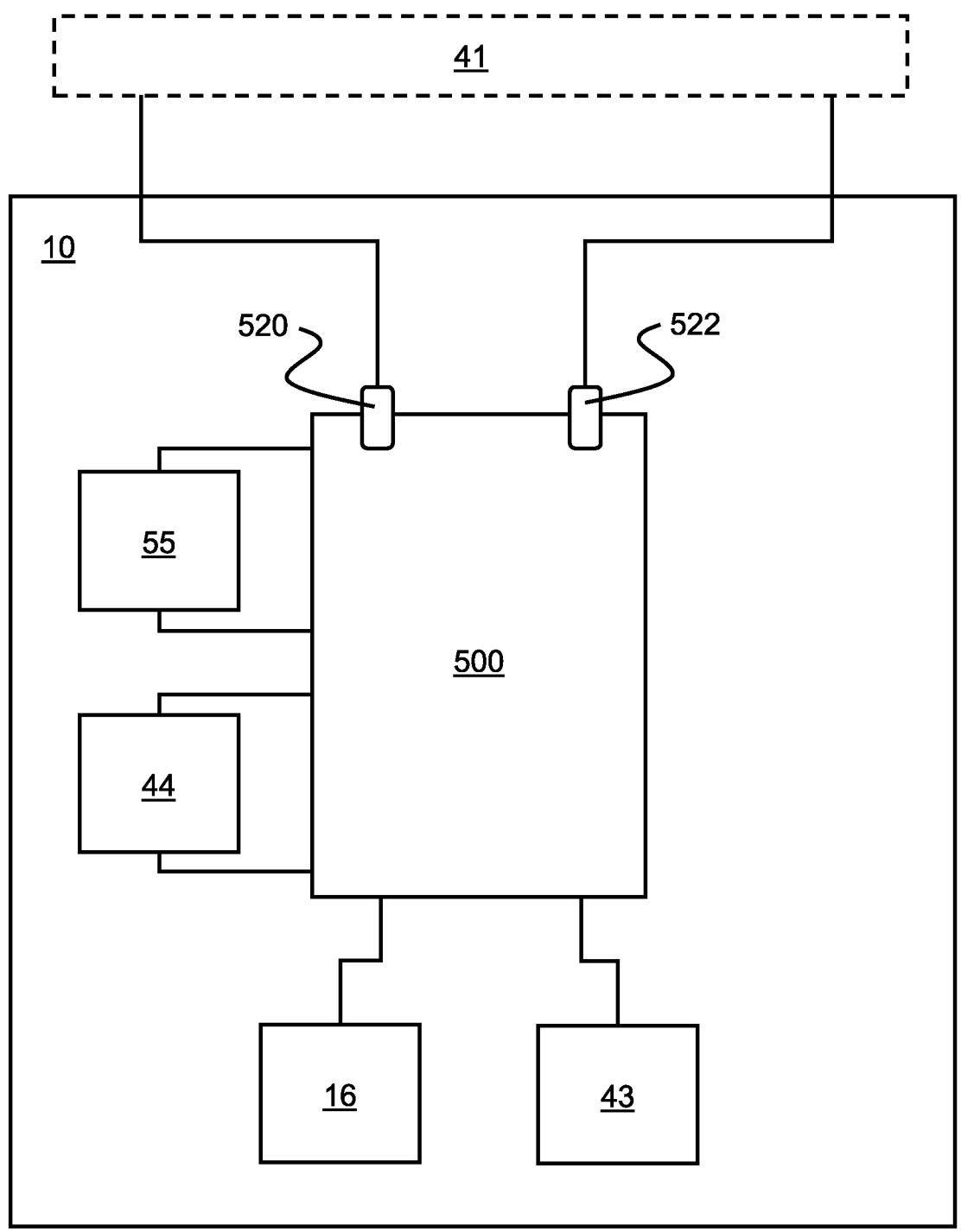
FIG. 6 shows a schematic view of a gas turbine engine comprising a fuel management system.

FIG. 6 shows a schematic view of a gas turbine engine 10 comprising a fuel management system 600. The fuel management system 600 may be in accordance with the examples discussed above with respect to FIGS. 5A and 5B. The gas turbine engine 10 provides fuel to the fuel management system inlet 520 and further comprises combustor 16, the downstream thermal load 44 and optionally the upstream thermal load 55 and/or the reheat 43. In the example of FIG. 6, the gas turbine engine 10 provides fuel to the fuel management system inlet 520 from a fuel tank 41. As shown in the example of FIG. 6, the gas turbine engine 10 may return fuel to the fuel tank 41 via the fuel management system outlet 522 for subsequent resupply to the fuel management system 500. The fuel tank 41 may be disposed within an airframe in which the gas turbine engine 10 is incorporated.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

The invention claimed is:

1. A fuel management system for a gas turbine engine, the fuel management system comprising:
a fuel supply line to configured to supply fuel from an inlet to a combustor of the gas turbine engine via a combustor valve, wherein the combustor valve is configured to pass a burn portion of the fuel from the fuel supply line to the combustor;
a first pump disposed on the fuel supply line configured to receive the fuel and discharge it at a first low pressure;
a combustor pump disposed on the fuel supply line upstream of the combustor valve, configured to receive the fuel discharged from the first pump and discharge it at a second higher pressure for supply to the combustor;
a downstream heat exchanger configured to reject heat from a downstream thermal load of the gas turbine engine to the fuel in the fuel supply line between the inlet and the combustor valve;
a downstream recirculation line configured to recirculate a downstream excess portion of the fuel from the fuel supply line, the downstream recirculation line extending from a downstream recirculation point on the fuel supply line between the downstream heat exchanger and the combustor valve;
the downstream recirculation line is configured to recirculate the downstream excess portion of the fuel for resupply to the fuel supply line;
an upstream heat exchanger configured to reject heat from an upstream thermal load of the gas turbine engine to the fuel in the fuel supply line upstream of the combustor pump;
an upstream recirculation line configured to recirculate an upstream excess portion of the fuel from the fuel supply line, the upstream recirculation line extending from an upstream recirculation point on the fuel supply line between the upstream heat exchanger and the combustor pump;
the upstream recirculation line is configured to recirculate the upstream excess portion of the fuel for resupply to the fuel supply line; and
the downstream heat exchanger is downstream of the upstream heat exchanger.

2. The fuel management system according to claim 1, wherein the downstream recirculation line is configured to recirculate the downstream excess portion of the fuel to a fuel tank for subsequent resupply to the fuel supply line.

3. The fuel management system according to claim 1, further comprising a fuel flow controller configured to:
receive a cooling signal relating to a cooling demand of the downstream thermal load; and
control the combustor pump to vary a flow rate of the fuel through the downstream heat exchanger based on at least the cooling signal to meet the cooling demand of the downstream thermal load.

4. The fuel management system according to claim 3, wherein the downstream thermal load comprises a process fluid circuit configured to circulate a process fluid, wherein the downstream heat exchanger is configured to reject heat from the process fluid to the fuel in the fuel supply line between the combustor pump and the combustor valve; and
wherein the cooling signal relates to a temperature of the process fluid at a temperature monitoring location of the process fluid circuit.

5. The fuel management system according to claim 3, wherein the fuel flow controller is configured to:
receive a burn signal relating to a fuel demand of the combustor; and
control the combustor pump and the combustor valve based on at least the cooling signal and the burn signal to meet the cooling demand of the downstream thermal load and to meet the fuel demand of the combustor.

6. The fuel management system according to claim 5, further comprising a flow sensor configured to monitor a burn flow rate of the burn portion of the fuel;
  wherein the control of the combustor pump and the combustor valve to meet the fuel demand of the combustor is based on at least the monitored burn flow rate.

7. The fuel management system according to claim 5, wherein
  the fuel flow controller is configured to receive a cooling signal relating to a cooling demand of the upstream thermal load; and
  the fuel flow controller is configured to control the first and combustor pumps and the combustor valve to meet the cooling demands of the upstream and downstream thermal loads, and to meet the fuel demand of the combustor.

8. The fuel management system according to claim 1, configured to control flow through each of the upstream recirculation line and the downstream recirculation line using respective upstream and downstream recirculation valves, the downstream recirculation valve being provided by the combustor valve;
  wherein the fuel management system is operable in at least:
    an upstream recirculation mode in which the upstream recirculation valve is open and the downstream recirculation valve is closed; and
    a downstream recirculation mode in which the upstream recirculation valve is closed and the downstream recirculation valve is open.

9. The fuel management system according to claim 8, wherein the downstream recirculation valve comprises a three-way valve configured to receive the fuel from the fuel supply line and selectively discharge the fuel to the combustor or the downstream recirculation line.

10. The fuel management system according to claim 8, wherein
  in the upstream recirculation mode, the fuel flow controller is configured to control the first pump to vary a flow rate of the fuel through the upstream heat exchanger to meet the upstream cooling demand;
  in the downstream recirculation mode, the fuel flow controller is configured to control at least the combustor pump to vary a flow rate of the fuel through the downstream heat exchanger to meet the downstream cooling demand; and
  in each of the modes, the fuel flow controller controls the first pump, the combustor pump and the downstream recirculation valve to meet the fuel demand of the combustor.

11. The fuel management system according to claim 10, wherein
  the fuel management system is further operable in a dual recirculation mode in which the upstream recirculation valve is open and the downstream recirculation valve is open;
  in the dual recirculation mode, the fuel flow controller is configured to:
    control the first pump to vary a flow rate of the fuel through the upstream heat exchanger to meet the upstream cooling demand;
    control at least the combustor pump to vary a flow rate of the fuel through the downstream heat exchanger to meet the downstream cooling demand; and
    control the upstream recirculation valve to cause or permit the upstream excess portion of the fuel to be recirculated by the upstream recirculation line for resupply to the fuel supply line, the excess portion of the fuel corresponding to a difference between the flow rates of the fuel through the upstream and downstream heat exchangers.

12. The fuel management system according to claim 1, further comprising a reheat fuel supply line configured to supply the fuel from a system inlet to a reheat of the gas turbine engine, the reheat fuel supply line extending from a reheat branching point on the upstream recirculation line to the reheat via a reheat pump and a reheat control valve.

13. The fuel management system according to claim 12, wherein the fuel flow controller is additionally configured to control the reheat pump and/or the reheat control valve to meet a fuel demand of the reheat.

14. A gas turbine engine comprising the fuel management system according to claim 1, wherein the gas turbine engine directs the fuel to a system inlet, and the gas turbine engine provides the combustor, the downstream thermal load, and the upstream thermal load and/or the reheat.

* * * * *